US007526804B2

(12) United States Patent
Shelest et al.

(10) Patent No.: US 7,526,804 B2
(45) Date of Patent: Apr. 28, 2009

(54) HARDWARE ASSIST FOR PATTERN MATCHES

(75) Inventors: Art Shelest, Sammamish, WA (US); Jason Garms, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 844 days.

(21) Appl. No.: 10/770,329

(22) Filed: Feb. 2, 2004

(65) Prior Publication Data
US 2005/0261877 A1 Nov. 24, 2005

(51) Int. Cl.
G06F 11/00 (2006.01)
H04L 9/32 (2006.01)
(52) U.S. Cl. .................. 726/22; 726/23; 726/24; 726/25; 713/187; 713/188
(58) Field of Classification Search ............ 726/22, 726/23, 24, 25; 713/187, 188
See application file for complete search history.

(56) References Cited

U.S. PATENT DOCUMENTS

| | | | | |
|---|---|---|---|---|
| 5,625,356 | A * | 4/1997 | Lee et al. ................ | 341/67 |
| 6,003,065 | A | 12/1999 | Yan et al. ............... | 709/201 |
| 6,058,482 | A | 5/2000 | Liu ....................... | 713/201 |
| 6,647,400 | B1 * | 11/2003 | Moran ................... | 707/205 |
| 6,658,363 | B2 | 12/2003 | Mejia et al. ............ | 702/125 |
| 6,708,168 | B2 * | 3/2004 | Evans .................... | 707/6 |
| 6,856,981 | B2 * | 2/2005 | Wyschogrod et al. ... | 706/48 |
| 7,134,143 | B2 * | 11/2006 | Stellenberg et al. .... | 726/25 |
| 7,243,165 | B2 * | 7/2007 | Kravec et al. .......... | 710/1 |
| 7,370,361 | B2 * | 5/2008 | de los Santos et al. .. | 726/24 |
| 2002/0048369 | A1 * | 4/2002 | Ginter et al. ........... | 380/277 |

(Continued)

OTHER PUBLICATIONS

Baskerville, R. "Information Systems Security Design Methods: Implications for Information Systems Development", *ACM Computing Surveys*, 1993, 25(4), 375-414.
Garfinkel, T. et al., "Terra: A Virtual Machine-Based Platform for Trusted Computing", *Proceedings of the 19th ACM Symposium on Operating Systems Principles*, 2003, 193-206.
Memik, G. et al., "A Flexible Accelerator for Layer 7 Networking Applications", *Proceedings of the 39th Conference on Design Automation*, 2002, 646-651.

*Primary Examiner*—Kambiz Zand
*Assistant Examiner*—Teshome Hailu
(74) *Attorney, Agent, or Firm*—Woodcock Washburn LLP (57) ABSTRACT

An application contacts the Application Specific Integrated Circuit (ASIC) with a request for a job, along with the name or identifier of a data stream to pattern match against, the name or identifier of the pattern set to use, and whether the job is partial or full. Depending on the priority rules set by the ASIC administrator, the ASIC may stop the job it is currently doing and begin work on the new job, or wait until the current job is finished before starting the new job. The ASIC determines if the pattern set for the new job is already stored in the cache, and contacts the calling application if it is not. Once the correct pattern set is loaded, the ASIC begins pattern matching on the requested data stream. The data stream is compared byte by byte with the each of the patterns in the loaded set. The ASIC will return a match to the calling application if a match has been made with one of the patterns in the pattern set.

37 Claims, 6 Drawing Sheets

U.S. PATENT DOCUMENTS

| | | | |
|---|---|---|---|
| 2003/0009699 A1* | 1/2003 | Gupta et al. | 713/201 |
| 2003/0014662 A1* | 1/2003 | Gupta et al. | 713/200 |
| 2003/0051026 A1* | 3/2003 | Carter et al. | 709/224 |
| 2003/0084328 A1* | 5/2003 | Tarquini et al. | 713/200 |
| 2003/0084330 A1* | 5/2003 | Tarquini et al. | 713/200 |
| 2003/0208487 A1* | 11/2003 | Oh et al. | 707/6 |
| 2004/0093513 A1* | 5/2004 | Cantrell et al. | 713/201 |
| 2004/0151382 A1* | 8/2004 | Stellenberg et al. | 382/219 |
| 2004/0255162 A1* | 12/2004 | Kim et al. | 713/201 |
| 2005/0097242 A1* | 5/2005 | Sarkar et al. | 710/36 |

* cited by examiner

HARDWARE ASSIST FOR PATTERN MATCHES

FIELD OF THE INVENTION

This invention relates in general to the field of pattern matching. More particularly, this invention relates to the use of a dedicated hardware device for pattern matching by anti-virus and security applications.

BACKGROUND OF THE INVENTION

Security software, such as anti-virus and intrusion detection systems, share a common need to perform pattern matching operations at a high rate of speed. Pattern matching refers to the process of searching for known byte patterns in a stream of data. The byte pattern is typically represented by an array of bytes containing properties describing how the match is performed. Pattern matching is a very CPU intensive process. Existing general-purpose CPUs are not optimized for the pattern matching operations, and even the best algorithms deliver disappointing performance.

In the field of anti-virus software, a common method for virus detection is to identify possible viruses entering the computer by pattern matching for known virus signatures in the incoming data stream. Since 1980, the number of known virus signatures has grown to well over 10,000, and continues to grow every year.

In view of the foregoing, there is a need for systems and methods that allow for fast and efficient pattern matching.

SUMMARY OF THE INVENTION

The present invention is directed to systems and methods for pattern matching bytes in a data stream using an application specific integrated circuit ("ASIC"). Several applications may require pattern matching and each of the applications may themselves require several different sets of patterns to match against the data stream. A pattern is a set of rules or functions the ASIC uses to determine if a match has been found in the data stream.

In order to initiate pattern matching, an application contacts the ASIC with a request for a job, along with the name or identifier of a data stream to pattern match against, and the name or identifier of the pattern set to use. Depending on the priority rules set by the ASIC administrator, the ASIC may stop the job it is currently doing and begin work on the new job, or wait until the current job is finished before starting the new job. The ASIC determines if the pattern set for the new job is already stored in the cache. The ASIC can store several pattern sets in a cache, allowing the ASIC to avoid the costly operation of retrieving a new pattern set from the applications for each new job. If the name or identifier of the pattern set to be used for the new job matches a name or identifier of a stored pattern set on the ASIC, the ASIC loads the stored pattern set. If no matching pattern set is found, the ASIC can request the application to send the pattern set to the ASIC.

Once the correct pattern set is loaded, the ASIC can begin pattern matching on the requested data stream. The data stream is compared byte by byte with the each of the patterns in the loaded set. The pattern set provided by an application may represent a full match or a partial match; this need not be communicated to the ASIC. When partial match pattern sets are used, the application has the additional computing burden of verifying the matches proposed by the ASIC. These verifications do not require a pattern search and can be done much faster with a general purpose CPU. The ASIC will continue on the current job, until the calling application sends it a message to stop or an application with a higher priority requests the ASIC do a job.

The ASIC can be configured to match multiple patterns from a pattern set against a data stream in parallel with one another. The ASIC can also be configured to load multiple pattern sets and match patterns from those pattern sets against a data stream in parallel.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF INVENTION

Figure 1:
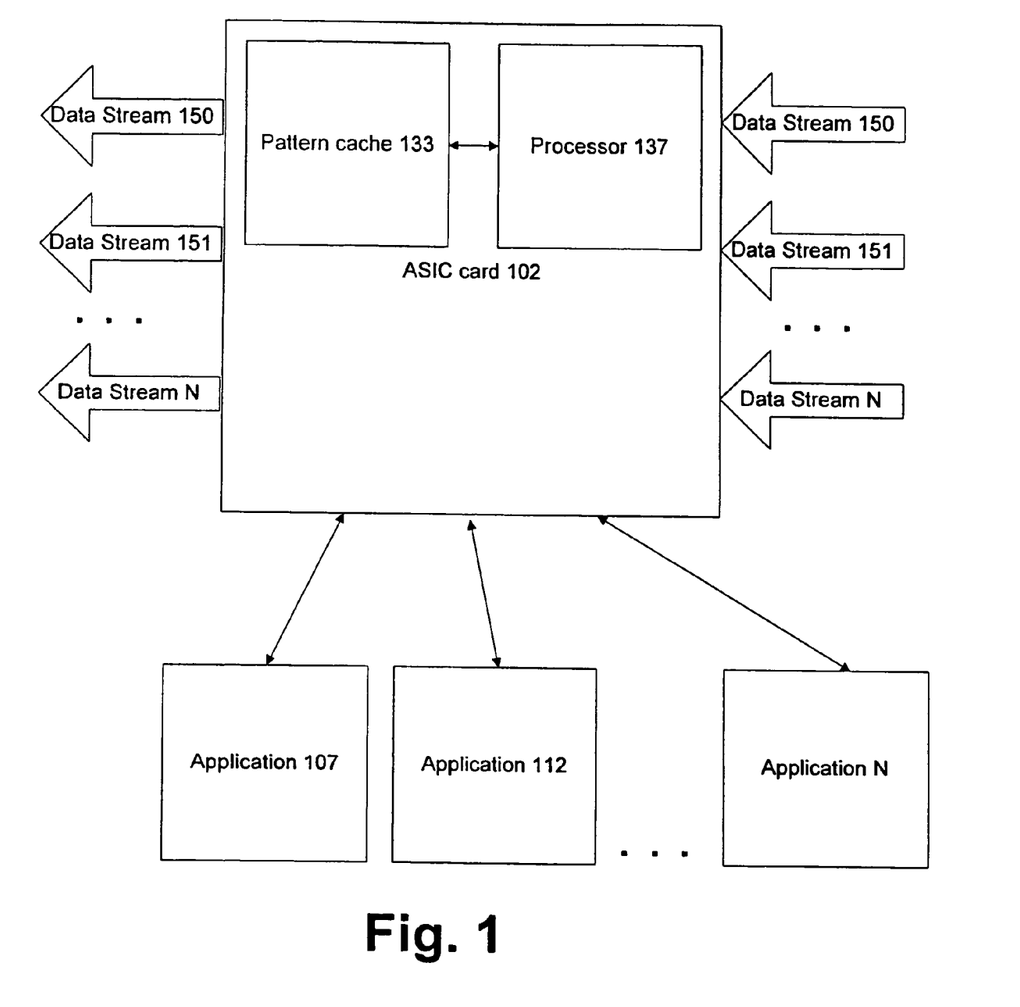
FIG. 1 is a block diagram of an exemplary system for pattern matching on computer using an ASIC in accordance with the present invention.

FIG. 1 is a block diagram of an exemplary system for pattern matching on computer using an ASIC. The exemplary system comprises an ASIC card 102 which desirably is a hardware device that is capable of matching patterns in a byte stream. The ASIC card 102 includes a pattern cache 133 and a processor 137. The ASIC card 102 receives data streams 150, 151. Data streams 150, 151 can include network data received through a local area network or the internet. Data streams 150, 151 are provided for illustrative purposes only, and not meant to limit the invention to only two data streams. There is no limitation on the number of data streams that can operate in accordance with the invention, as shown by data stream N. The ASIC card 102 is desirably implemented as a stand alone card, part of a network interface card, integrated into a motherboard, or as part of any device having access to a data stream.

The pattern cache 133 is a desirably a memory or storage device that stores pattern sets used by the processor 137 to match patterns in the data streams 150, 151. Preferably, the ASIC card 102 can pattern match for several applications 107, 112. Applications 107, 112 are provided for illustrative purposes only, and not meant to limit the invention to only two applications. There is no limitation on the number of applications that can operate in accordance with the invention, as shown by application N.

Each application may use several different pattern sets. The pattern set(s) last used by an application is desirably stored in the pattern cache 133. It may be appreciated that by storing the last used pattern sets in the pattern cache 133, the ASIC card 102 can avoid the costs associated with retrieving a new pattern set from an application each time the ASIC card 102 begins a new job. The pattern cache 133 can be formed using a conventional RAM or various other types of storage devices.

The processor 137 is desirably a processor specialized for pattern matching in a data stream. When the processor 137 receives a request for a job from an application 107, 112, the processor 137 determines if the application has priority over the job that it is currently processing. If the new job does not have priority, the processor 137 can add the new job to a queue for later processing. If the new job does have priority over the current job, the processor 137 then determines if there is a pattern set in the pattern cache 133 matching the pattern set for use by the new job. The current job is desirably stopped and queued for resumption at a later time. The processor 137 may receive a pattern name or identifier from the application that can be checked against the patterns stored in the pattern cache 133. If there is no match, then the processor 137 can request the pattern set from the application.

In another embodiment, the processor 137 can receive a flag from the application indicating that a new pattern set should be retrieved; otherwise, the processor 137 will attempt to find and use a previously stored pattern set for that application from the pattern cache 133.

The processor 137 can load the desired pattern set and begin processing on the data streams 150, 151. The data streams 150, 151 can be any of various types of data streams, such as network traffic moving through a network interface card or firewall.

The processor 137 can match the patterns in the pattern set against the data streams 150, 151 in parallel. Multiple patterns can be simultaneously matched against the data streams 150,151 by the processor 137. In addition, multiple pattern sets can be loaded into the processor 137, allowing the processor 137 the ability to match multiple patterns sets against the data streams 150, 151 in parallel. Any system, method, or technique known in the art for parallel processing can be used, such as multiple processors.

Applications 107, 112 can be software application(s) that use virus pattern matching. The applications 107, 112 request the ASIC card 102 to perform pattern matching on the data streams 150, 151 using patterns provided by the applications. Each application may use multiple pattern sets. When an application requests a job, it may specify that the job should be performed using a particular pattern set. In one embodiment, the application may specify when the ASIC card 102 should use a new or different pattern set. In another embodiment, the application may send the ASIC card 102 the name or identifier of the pattern set that should be used for the job, and the application will only send the pattern set if the ASIC card 102 determines that it does not have access to the current named pattern set (e.g., in the cache associated with the ASIC).

Applications 107, 112 can be configured to receive both partial and complete matches from the ASIC card 102. The ASIC card 102 may receive a partial pattern from the applications 107, 112. A partial pattern is a pattern that when matched against the data stream by the ASIC, still requires verification by the applications 107, 112. When using partial patterns, the application 107, 112 can be configured to verify if a match returned by the ASIC using a partial pattern is a real match for the purposes of the applications. A user or administrator desirably determines when partial patterns are used by applications 107, 112, and programs or configures the application 107, 112 to verify if returned matches are real matches for the purposes of the applications. The operation of the ASIC is unaffected by the use of partial or complete pattern sets.

Figure 2:
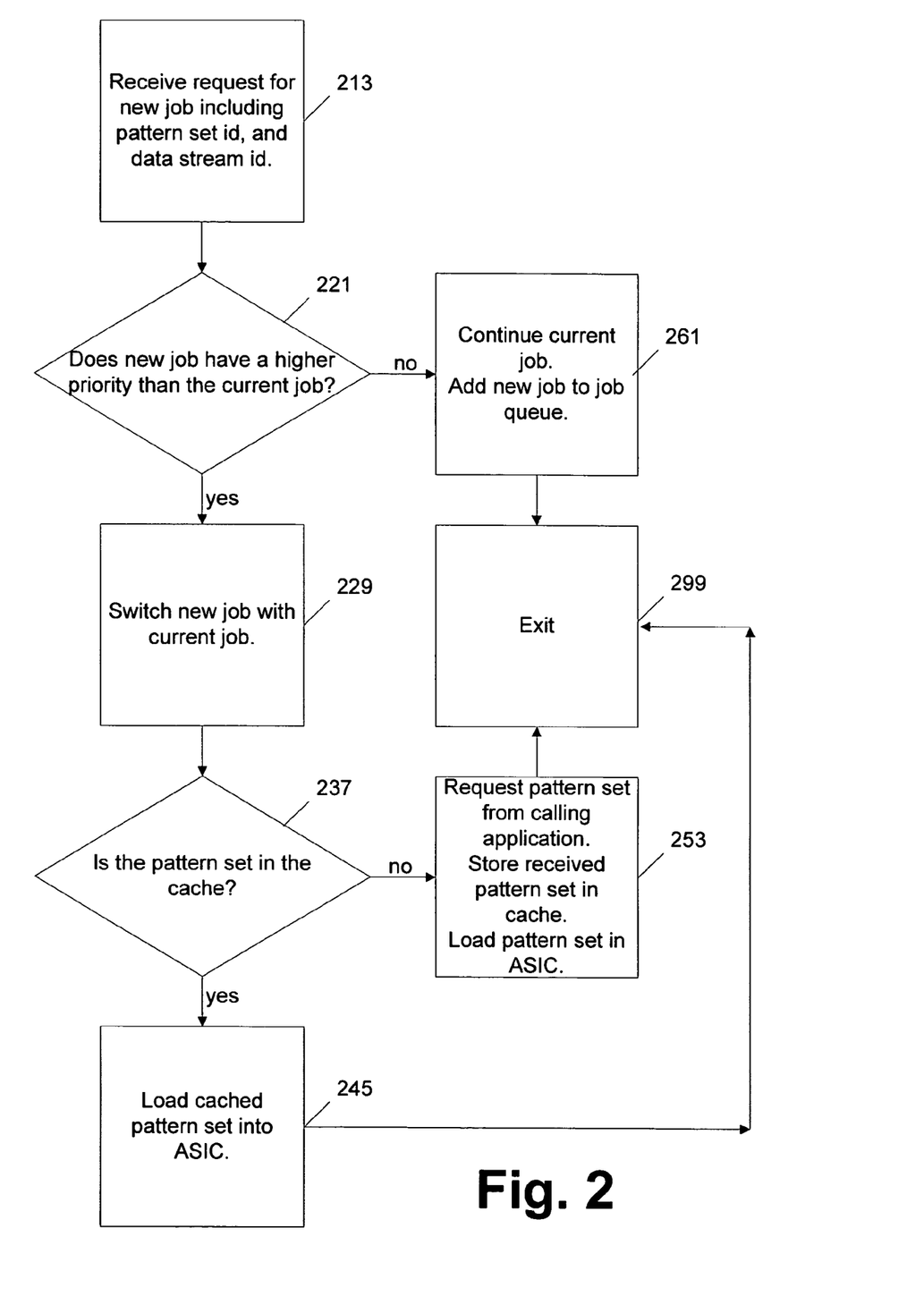
FIG. 2 is a flow diagram of an exemplary method for pattern loading in accordance with the present invention.

FIG. 2 is a flow diagram of an exemplary method for pattern loading in accordance with the present invention. A request for a pattern matching job is received by an ASIC. The ASIC determines if the job has a higher priority than a current job. If the new job has a higher priority, the ASIC returns the current job to a queue for future processing, loads the new job, and looks for the appropriate new pattern set in the cache. If the pattern set is not in the cache, the ASIC requests it from the calling application, and after loading the received pattern set, the ASIC begins processing.

More particularly, at 213, an ASIC receives a request for a new job from a calling application. The request may include an application identification, a pattern set identification, and a data stream identification. The application identification is desirably a unique identifier, such as a number, associated with each application that can request jobs on the ASIC. The application identification is desirably used by the ASIC to determine the priority of a job.

The pattern set identification is desirably a unique identifier, such as a number, associated with each pattern set. The pattern set identification is desirably generated by the application. The pattern set identification is desirably used, along with the application identification, to store and retrieve pattern sets from the pattern cache.

The data stream identification is desirably a unique identifier, such as a number, associated with each data stream. The data stream identification is desirably generated by the ASIC. The data stream identification is desirably used by the ASIC and the application to refer to the data stream that can be pattern matched for a given job.

At 221, the ASIC determines if the new job has a higher priority than the current job. If there is no current job, then the embodiment continues at 229. If there is a current job, the ASIC can determine if the new job has a higher priority than the current job by comparing the application identification of the current job with the application identification of the new job. For example, an administrator may have ranked the priority of the applications, allowing the ASIC to determine the priorities by reference to a stored file. Any method, system, or technique for determining priorities known in the art may be used.

If the new job has a higher priority than the current job, then the embodiment continues at 229 where the new job can begin processing; otherwise, the embodiment continues at 261 where the new job is desirably added to a job queue.

At 229, the ASIC loads the new job, and if desired, place the old job into a job queue for processing at a later time.

At 237, the ASIC determines if a pattern set with a pattern set identification and application identification matching the new job is in the pattern cache. It is appreciated that the pattern set identification is unique to the application that generated it, so using the pattern set identification along with the application identification uniquely identifies a pattern set in the pattern cache. If the ASIC finds a matching pattern set in the pattern cache, the application continues at 245 where the cached pattern set is loaded; otherwise, the embodiment continues at 253 where the pattern set is requested from the ASIC.

At 245, the pattern set stored in the pattern cache is loaded into the processor on the ASIC for processing.

At 253, the ASIC requests the calling application to send the pattern set matching the pattern set identification. The ASIC can store the received pattern set, along with the pattern set identification and the application identification, in the pattern cache. It can be appreciated that by storing the received pattern set in the pattern cache, future jobs can easily retrieve the pattern set from the pattern cache, avoiding costly transfers from the calling application. Once the pattern set has been stored, the ASIC can load the pattern set into the processor to begin pattern matching, as described further below. The process then exits at 299.

Returning to 261, at this point, the ASIC has determined that the new job has a lower priority than the current job. The ASIC can add the new job to a job queue, where the new job will be desirably performed after the queued jobs of a higher priority. Any system, method, or technique known in the art for queuing jobs for processing can be used. At 299, the process exits.

Figure 3:
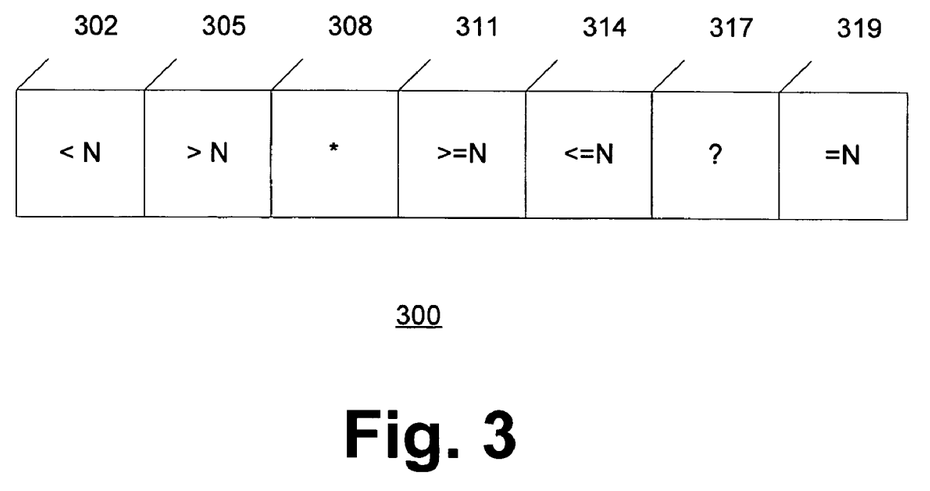
FIG. 3 is a block diagram of an exemplary pattern in accordance with the present invention.

FIG. 3 is a block diagram of an exemplary pattern 300 in accordance with the present invention. A pattern may contain several functions 302, 305, 308, 311, 314, 317, and 319, described further below. The functions are performed, preferably one at a time, on a data stream. If a function is true, indicating that the byte (or bytes) in the data stream matches the function, then the next function is performed on the next byte in the data stream. This continues until a function is false, or until all of the functions are true. If all of the functions are true, then it is determined that a match has been found in the data stream. On the other hand, if a function is false, then the process begins again with the current byte in the data stream being compared with the first function in the pattern.

Functions 302, 305, 308, 311, 314, 317, and 319 are provided for illustrative purposes only, and not meant to limit the invention to the functions shown or described herein. There is no limitation on the number of functions that can operate in accordance with the invention. Moreover, a function can act on a single byte or multiple bytes, either consecutive or not.

Function 302, represented by "<N", is true if the current byte in the data stream is less than N. If the byte in the data stream is less than N the function is true, or else it is false.

Function 305, represented by ">N", is true if the current byte in the data stream is greater than N. If the byte in the data stream is greater than N the function is true; otherwise, it is false.

Function 308 is true for any number bytes in the data stream and is represented by "*". The function is always true for any number of bytes in the data stream.

Function 311, ">=N", is true if the current byte in the data stream is greater than or equal to N. If the byte in the data stream is greater than or equal to N the function is true; otherwise, it is false.

Function 314, "<=N", is true if the current byte in the data stream is less than or equal to N. If the byte in the data stream is less than or equal to N the function is true, or else it is false.

Function 317 is represented by "?" and is always true for a given byte. The function will always be true so long as there is a byte remaining in the data stream.

Function 319, "=", is true if the current byte in the data stream is equal to N. If the byte in the data stream is equal to N the function is true; otherwise, it is false.

Figure 4:
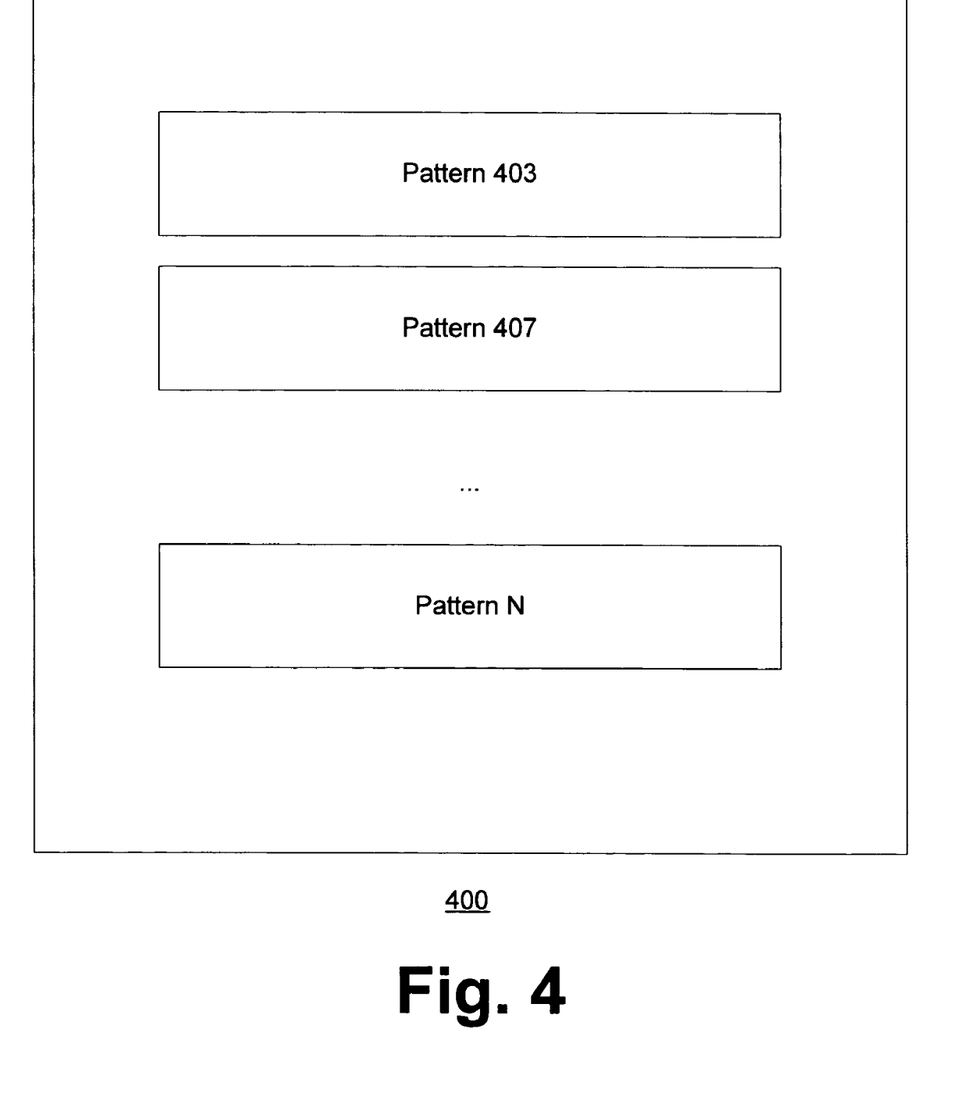
FIG. 4 is a block diagram of an exemplary pattern set in accordance with the present invention.

FIG. 4 is a block diagram of an exemplary pattern set 400 in accordance with the present invention. A pattern set can be made up of one or more patterns 403, 407. Each pattern in the pattern set represents a particular set of byte strings that are matched against the incoming data stream by the ASIC. The patterns are made up of functions such as those illustrated in, and described with respect to, FIG. 3. Patterns 403, 407 are provided for illustrative purposes only, and not meant to limit the invention to only two patterns. There is no limitation on the number of patterns that can operate in accordance with the invention, as shown by pattern N. The various patterns can be used on various data streams. For example, pattern 403 can be used with respect to data stream 150 (in FIG. 1), and pattern 407 can be used with respect to data stream 151. It is further contemplated that multiple patterns can be used with respect to a single data stream or multiple data streams.

Figure 5:
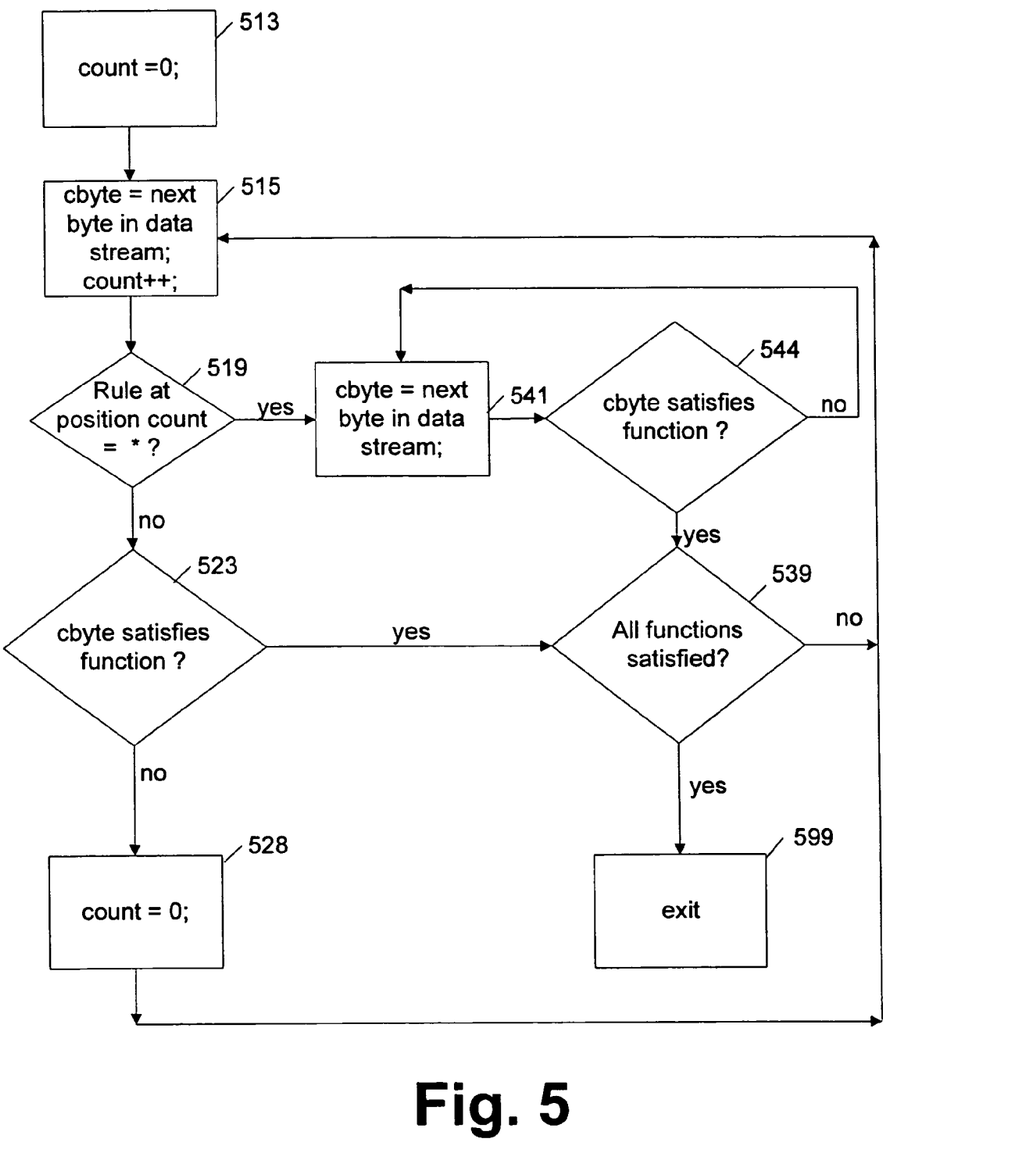
FIG. 5 is a flow diagram of an exemplary method for pattern matching in accordance with the present invention.

FIG. 5 is a flow diagram of an exemplary method for pattern matching in accordance with the present invention. After a pattern is loaded (e.g., as described with respect to FIG. 2), the pattern is matched against bytes in a data stream. More particularly, bytes are received from an incoming data stream and are matched against functions stored in a pattern. When a byte matches a stored function, the following byte is compared to the next function in the pattern. If that byte matches the next function in the pattern, then the following byte is then compared to the next function in the pattern and so forth. If a successive byte does not match a function, then the next byte is compared to the first function in the pattern. This continues until a predetermined number of matches have been made in the pattern, or there are no more bytes remaining in the data stream. Note that multiple bytes can be acted upon by a particular function (i.e., multiple bytes, as opposed to a single byte, will be compared to a particular function).

At 513, a counting variable ("count") is created and set to 0. Count can represent the current position in the pattern being matched. A variable "cbyte" can also be created to hold the current byte of the data stream being examined.

At 515, cbyte can be set to the next byte in the data stream. If processing has just begun, cbyte can be set to the first byte in the data stream. Count is then incremented by 1.

At 519, the function position count in the pattern is examined. If the rule or function is "*", as described with respect to FIG. 3, then the embodiment can move to 541 for special handling of the "*" function. Otherwise, the embodiment continues to 523.

At 523, it is determined if cbyte satisfies the function at position count. If it does, the embodiment continues at 539. Otherwise, the embodiment proceeds at 528. At 528, it has been determined that cbyte did not satisfy the function in the pattern at position count. Therefore, the current position in the pattern should be reset, indicating that the pattern matching will restart at the first function in the pattern. Count is set to 0, and the embodiment returns to 515.

At 539, cbyte has satisfied the rule or function at position count. The embodiment can now determine if the entire pattern has been satisfied. If the value of count is equal to the size of the pattern, then the pattern has been satisfied. If the pattern has been satisfied, then the match is desirably returned to the calling application and the embodiment may exit at 599; otherwise, the embodiment returns to 515.

At 541, the rule or function at position count in the pattern is "*" or its equivalent or a similar function. The function or rule matches any number of bytes in the data stream, and is handled by examining sequential bytes in the data stream until a byte that matches the function at count+1 is found. Cbyte can be set to the next byte in the data stream.

At 544, cbyte is examined to see if it satisfies the function at position count+1. If it does, the embodiment continues at 539. Otherwise, the embodiment returns to 541.

Exemplary Computing Environment

Figure 6:
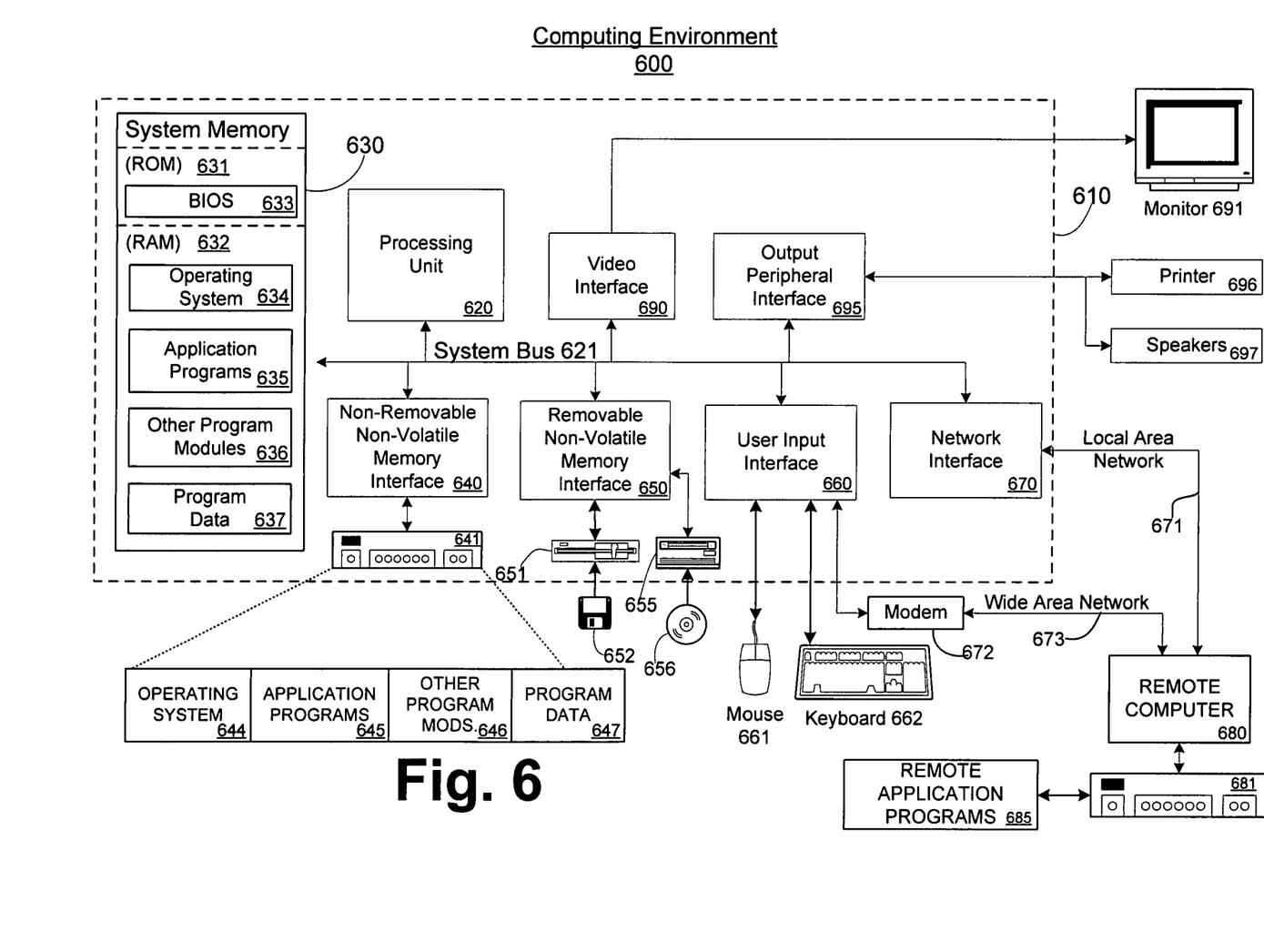
FIG. 6 is a block diagram showing an exemplary computing environment in which aspects of the invention may be implemented.

FIG. 6 illustrates an example of a suitable computing system environment 600 in which the invention may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 610 typically includes a variety of computer readable media. Computer readable media can be any available media that can be accessed by computer 610 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or non-volatile memory such as ROM 631 and RAM 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/non-volatile computer storage media. By way of example only, FIG. 6 illustrates a hard disk drive 640 that reads from or writes to non-removable, non-volatile magnetic media, a magnetic disk drive 651 that reads from or writes to a removable, non-volatile magnetic disk 652, and an optical disk drive 655 that reads from or writes to a removable, non-volatile optical disk 656, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted include a LAN 671 and a WAN 673, but may also include other networks. Such networking environments are commonplace in offices, enterprise-wide computer networks, intranets and the internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the finctionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for pattern matching comprising:
receiving a request for a job at a hardware device from an application, the application being instantiated on a processor of a computing device and the hardware device comprising an ASIC (Application Specific Integrated Circuit) card mounted to the computing device and communicatively coupled to the processor of the computing device, the request comprising a pattern set identification and a data stream identification;
locating a pattern set for the received job based on the pattern set identification;
selecting a data stream based on the data stream identification;
receiving the selected data stream at the ASIC card; and
matching the pattern set against the data stream at the ASIC card.

2. The method of claim 1, further comprising determining if the received job has a higher priority than a current job.

3. The method of claim 2, wherein the request further comprises an application identification, and wherein determining if the received job has a higher priority than the current job is performed by the hardware device using the application identification.

4. The method of claim 3, wherein the priority of the received job is predetermined.

5. The method of claim 1, wherein the request further comprises an application identification, and wherein locating the pattern set for the received job comprises:
searching for the pattern set in a cache using the pattern set identification and application identification by the hardware device;
requesting the pattern set from the application if the pattern set is not in the cache;
receiving the requested pattern set by the hardware device; and
storing the received pattern set in the cache.

6. The method of claim 1, further comprising loading the pattern set into a processor that is optimized for pattern matching.

7. The method of claim 1, wherein the data stream is selected by the hardware device.

8. The method of claim 1, wherein matching the pattern set against the data stream is performed by a processor at the hardware device.

9. The method of claim 8, further comprising returning the results of the matching to the application, wherein the returned results include at least one match found by the processor.

10. The method of claim 9, wherein at least two of the steps of receiving, locating, selecting, matching, and returning the results are performed in parallel.

11. The method of claim 9, wherein the pattern set includes partial patterns and the application is configured to verify partial matches.

12. The method of claim 8, wherein patterns in the pattern set are matched against the data stream in parallel.

13. The method of claim 1, wherein matching the pattern set against the data stream comprises:
receiving a byte from the data stream;
determining if the byte satisfies a function of a pattern in the pattern set; and continuing to determine if subsequent received bytes satisfy subsequent functions of the pattern set, until a subsequent received byte does not satisfy a subsequent function of the pattern set, or a partial or complete match is found.

14. A system for pattern matching comprising a computing device having:
a processor upon which is instantiated an application; and
a hardware device that receives a request for a job from the application, the hardware device comprising an ASIC (Application Specific Integrated Circuit) card mounted to the computing device and communicatively coupled to the processor of the computing device, the request comprising a pattern set identification and a data stream identification, where the hardware device locates a pattern set for the received job based on the pattern set identification, selects a data stream based on the data stream identification, receives the selected data stream at the ASIC card, and matches the pattern set against the data stream at the ASIC card.

15. The system of claim 14, wherein the hardware device determines if the received job has a higher priority than a current job.

16. The system of claim 15, wherein the request further comprises an application identification, and wherein determining if the received job has a higher priority than the current job is performed by the hardware device using the application identification.

17. The system of claim 16, wherein the priority of the received job is predetermined.

18. The system of claim 14, wherein the request further comprises an application identification, and wherein the hardware device locates the pattern set for the received job by:
searching for the pattern set in a cache using the pattern set identification and application identification by the hardware device;
requesting the pattern set from the application if the pattern set is not in the cache;
receiving the requested pattern set by the hardware device; and storing the received pattern set in the cache.

19. The system of claim 14, wherein the hardware device loads the pattern set into a processor that is optimized for pattern matching.

20. The system of claim 14, wherein the hardware device selects the data stream.

21. The system of claim 14, wherein the hardware device matches the pattern set against the data stream using a processor.

22. The system of claim 21, wherein the hardware device returns the results of the matching to the application, wherein the returned results include at least one match found by the processor.

23. The system of claim 21, wherein patterns in the pattern set are matched against the data stream by the processor in parallel.

24. The system of claim 21, wherein multiple pattern sets are matched against the data stream by the processor in parallel.

25. The system of claim 22, wherein the pattern set includes partial patterns, and the application is configured to verify partial matches.

26. The system of claim 14, wherein the hardware matches the pattern set against the data stream by:
receiving a byte from the data stream;
determining if the byte satisfies a first function of a pattern in the pattern set; and
continuing to determine if subsequent received bytes satisfy subsequent functions of the first pattern set, until a subsequent received byte does not satisfy a subsequent function of the pattern set, or a partial or complete match is found.

27. The system of claim 14, wherein the hardware device is an application specific integrated circuit.

28. The system of claim 27, wherein the hardware device is part of a network interface device.

29. The system of claim 27, wherein the hardware device is part of a motherboard.

30. A computer-readable medium having stored thereon computer-executable instructions for performing a method of pattern matching, the method comprising:
receiving a request for a job at a hardware device from an application, the application being instantiated on a processor of a computing device, the hardware device comprising an ASIC (Application Specific Integrated Circuit) card mounted to the computing device and communicatively coupled to the processor of the computing device, the request comprising a pattern set identification and a data stream identification;
locating a pattern set for the received job based on the pattern set identification;
selecting a data stream based on the data stream identification;
receiving the selected data stream at the ASIC card; and
matching the pattern set against the data stream at the ASIC card,
wherein the request further comprises an application identification, and wherein locating the pattern set for the received job comprises computer-executable instructions for:
searching for the pattern set in a cache using the pattern set identification and application identification by the hardware device;
requesting the pattern set from the application if the pattern set is not in the cache;
receiving the requested pattern set by the hardware device; and
storing the received pattern set in the cache.

31. The computer-readable medium of claim 30, further comprising computer executable instructions for determining if the received job has a higher priority than a current job.

32. The computer-readable medium of claim 30, wherein determining if the received job has a higher priority than the current job is performed by the hardware device using the application identification.

33. The computer-readable medium of claim 30, wherein matching the pattern set against the data stream comprises computer-executable instructions for:
receiving a byte from the data stream;
determining if the byte satisfies a function of a pattern in the pattern set; and continuing to determine if subsequent received bytes satisfy subsequent functions of the pattern set, until a subsequent received byte does not satisfy a subsequent function of the pattern set, or a partial or complete match is found.

34. A hardware device comprising an ASIC (Application Specific Integrated Circuit) card for being mounted to the a computing device and communicatively coupled to a processor of the computing device, the ASIC card comprising:
a processor separate from the processor of the computing device, the processor of the ASIC card specialized for matching pattern sets against a data stream, receiving a job request, determining the priority of a job, selecting the data stream, and returning a result;

a queue specialized for storing and retrieving the job request; and a cache specialized for storing at least one pattern set, and retrieving a pattern set.

35. The hardware device of claim 34, wherein the processor matches pattern sets against the data stream by:

receiving a first byte from the data stream;

determining if the first byte satisfies a first function of a first pattern in the pattern set; and continuing to determine if subsequent received bytes satisfy subsequent functions of the first pattern set, until a subsequent received byte does not satisfy a subsequent function of the first pattern set, or a partial or complete match is found.

36. The hardware device of claim 34, wherein the processor, queue, and cache are comprised within an application specific integrated circuit.

37. The hardware device of claim 36, wherein the application specific integrated circuit is comprised within a network interface device.

* * * * *